June 10, 1924.

J. P. MEAD 1,497,650

LAWN MOWER SHARPENING MECHANISM

Filed Sept. 10, 1921   3 Sheets-Sheet 1

INVENTOR
J. P. Mead
BY
P. T. Dodge
ATTORNEY

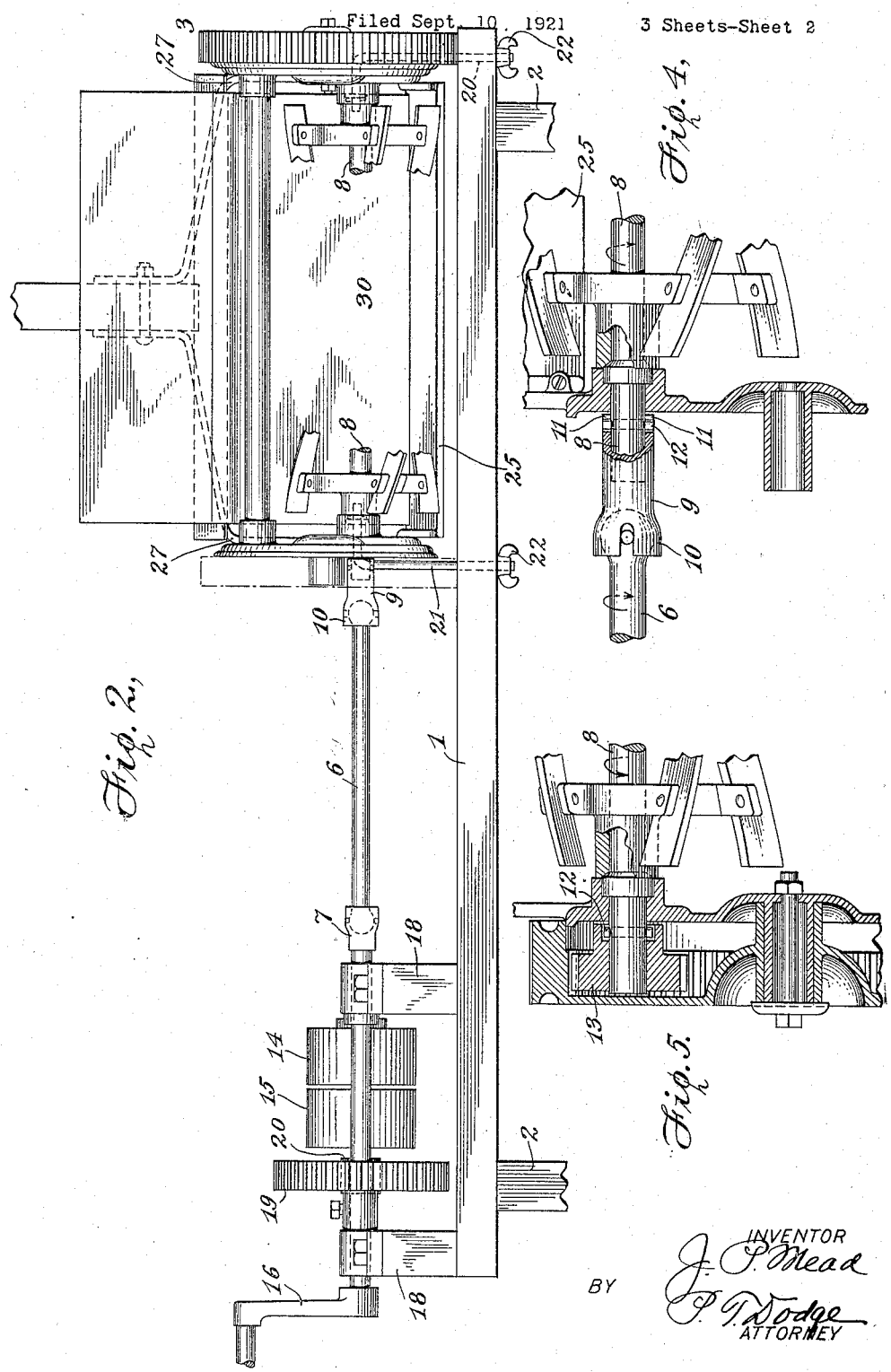

June 10, 1924.
J. P. MEAD
LAWN MOWER SHARPENING MECHANISM
Filed Sept. 10, 1921  3 Sheets-Sheet 3
1,497,650
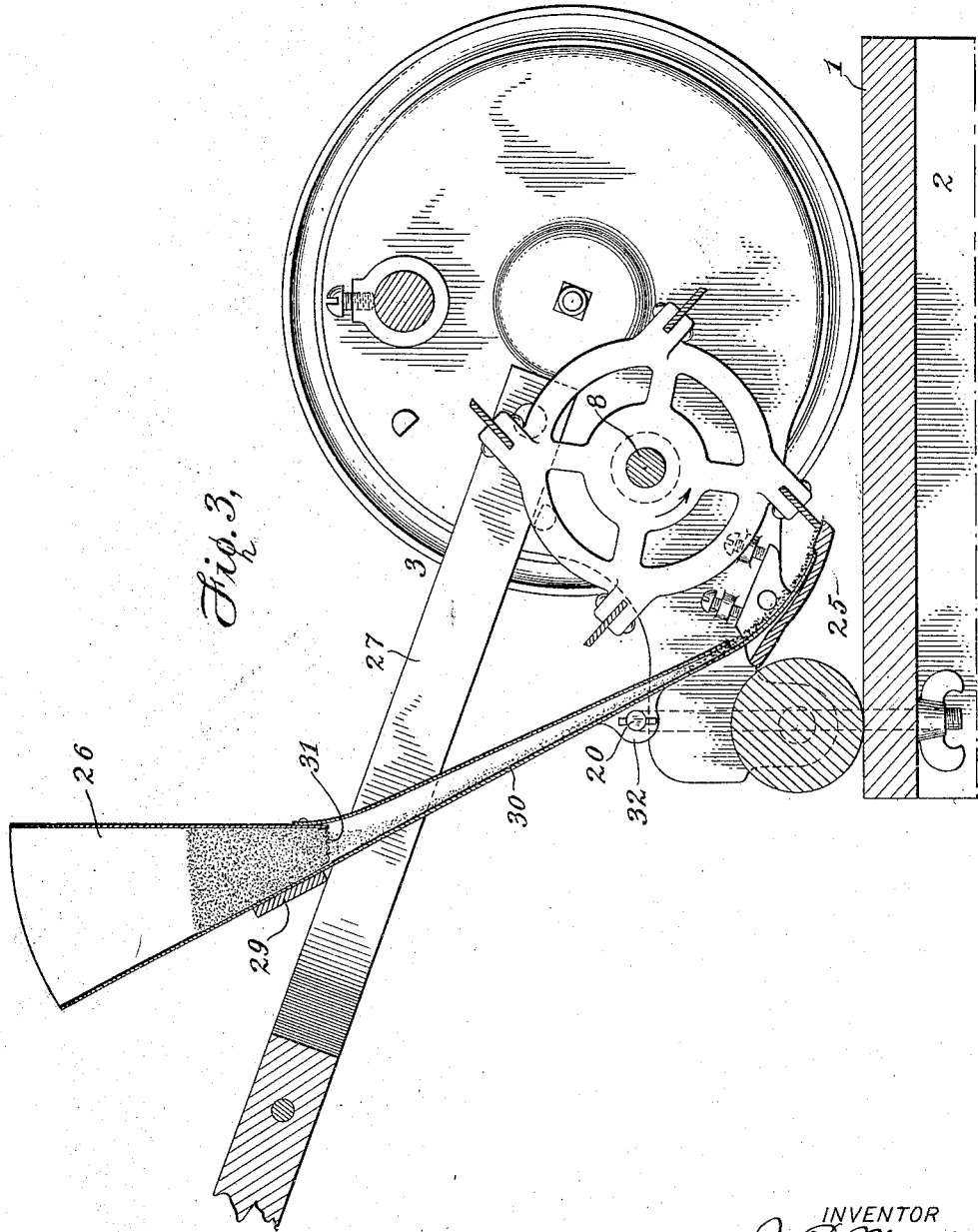
INVENTOR
J. P. Mead
BY
P. T. Dodge
ATTORNEY Patented June 10, 1924.

1,497,650

UNITED STATES PATENT OFFICE.

JAMES P. MEAD, OF PIERSON, IOWA; GEORGE A. MEAD ADMINISTRATOR OF SAID JAMES P. MEAD, DECEASED.

LAWN-MOWER-SHARPENING MECHANISM.

Application filed September 10, 1921. Serial No. 499,666.

*To all whom it may concern:*

Be it known that I, JAMES P. MEAD, a citizen of the United States, residing at Pierson, in the county of Woodbury and State of Iowa, have invented certain new and useful Improvements in Lawn-Mower-Sharpening Mechanism, of which the following is a specification, reference being had therein to the accompanying drawing.

This invention relates to means for sharpening the cutter knives of lawn mowers, and the invention consists of a mechanism of improved form and construction adapted to be operated either by hand or power as desired, which mechanism may be readily connected in operative relation to the knife reel of a lawn mower and operated to rotate said reel backwards or in a direction reverse to its normal rotation; whereby the cutting edges of the knives will impinge against the fixed cutter bar of the mower and be thereby sharpened.

My improved mechanism embodying the above mentioned characteristics will be fully described in the specification to follow, and the novel parts thereof will be set forth in the appended claims.

In the accompanying drawings:

Fig. 2 is a front elevation of the parts shown in Fig. 1.

Fig. 3 is a cross section through the lawn mower from front to rear showing the hopper for supplying abrasive to the cutter bar in the sharpening operation.

Fig. 4 is a fragmentary sectional elevation on an enlarged scale showing the connection of the operation member of the mechanism with the knife reel shaft of the lawn mower.

Fig. 5 is a fragmentary sectional elevation of the driving devices for the knife reel shaft of the mower in their normal relations, showing the parts which are removed preparatory to the connection of the sharpening mechanism.

Figure 1:
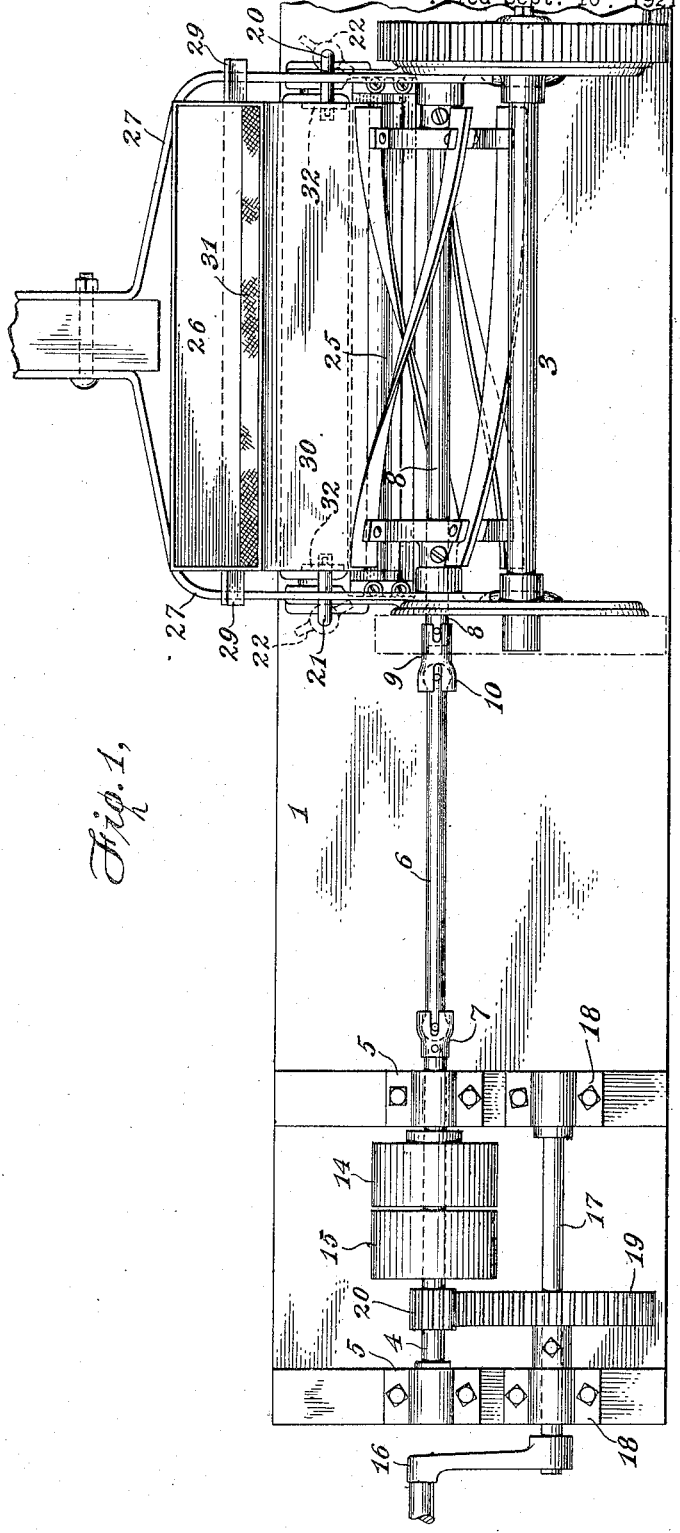
Fig. 1 is a top plan view of my improved mechanism showing the same coupled in operative relation to a lawn mower.

Referring to the drawings:

The operative parts of the mechanism are sustained by a base or bed plate 1 which may be supported by legs 2, or attached to a wall, or otherwise suitably sustained, and to this bed plate the lawn mower 3 whose cutting knives are to be sharpened, is firmly and fixedly clamped by the means to be presently described. The improved mechanism comprises a main operating member consisting in the present instance of a horizontal rotary shaft 4 mounted in suitable bearings 5 extending upwardly from the bed plate, and an extension of the shaft in the form of a coupling rod 6 which is flexibly connected with the shaft by means of a universal or gimbal joint 7. The rod 6 thus connected with the shaft is adapted to be rotated thereby although it may assume different angular relations to the shaft, and at its opposite end it is adapted to be coupled with the end of the knife reel shaft 8 of the lawn mower in order to transmit the rotary motion of the shaft to the reel. To effect a driving connection of these parts a coupling head 9 is flexibly connected with the end of the rod by a universal or gimbal joint 10, the said head being hollow to receive the end of the knife reel shaft, and being provided with opposed longitudinal open slots 11 adapted to embrace the pin 12 which is used to fasten the reel shaft driving pinion 13 to the reel shaft as shown in Fig. 5. It is understood that this pinion is removed from the knife reel shaft before the coupling head 9 is engaged with the shaft.

The shaft 4 may be rotated in any suitable manner. As shown it is adapted to be operated either by power by means of a drive pulley 14 fast on the shaft and a pulley 15 loose on the shaft, or by hand. When operated by hand, an operating crank 16 is fixed to a shaft 17 extending parallel with the shaft 4 in front of the same and mounted in suitable bearing 18 extending upwardly from the bed plate. This shaft carries a driving pinion 19 which meshes with a driven pinion 20 on shaft 4, the arrangement being such that when the crank is turned in a clockwise direction, the knife reel shaft will be rotated in a counter-clockwise direction to effect the sharpening action. When the mechanism is to be operated by power by means of a driving pulley, the shaft 17 and parts attached thereto may be removed by first detaching the caps of the bearings 18.

In sharpening a lawn mower by the mechanism described, one of the ground wheels is first removed from the machine which will expose the knife reel driving pinion 13, and the latter is withdrawn endwise and disengaged from the pin 12 and shaft. The lawn mower is now set on the bed plate and shifted endwise toward the coupling rod 6 until the exposed end of the knife reel shaft enters the coupling head 9, and the pin on the shaft enters the slots in the coupling head as best shown in Fig. 4. The lawn mower is now clamped down firmly on the bed plate, which clamping action is effected in the present instance by means of outer and inner hooked clamping bolts 20 and 21, the upper hooked portions of which are engaged over the frame of the lawn mower at its opposite ends, whence the bolts extend downward through the bed plate to the under side of the same where they are provided with wing nuts 22 which engage the underside of the bed plate. With the lawn mower thus held firmly on the bed plate, and with the shaft 4 coupled with the knife reel shaft, the rotation of the shaft, which may be effected either by power means or by hand as described, will impart a reverse rotation to the knife reel with the result that the cutting edges of the knives will be caused to impinge successively and repeatedly against the fixed cutter bar 25 of the lawn mower, whereby the sharpening of the blades will be effected in a uniform and speedy manner.

In order to hasten and facilitate the sharpening action, an abrasive material, such as emery powder or the like, is applied to the cutter bar at the point where the cutting edges of the knives are impinged against the same. This is effected in the present instance by means of a hopper 26 which extends transversely of the lawn mower in an upright position between the handle braces 27, the hopper being supported by said braces by means of a supporting bar 29 fixed to the rear side of the hopper and resting at its ends upon said braces. A spout 30 is attached to the lower end of the hopper and leads downwardly and rests on the upper side of the cutter bar so that the abrasive material passing from the hopper to the spout will be thereby directed to the front portion of the cutter bar where the revolving knives impinge against the same. The hopper is provided with a reticulated bottom or screen 31 to control the discharge of the abrasive therefrom, and the discharge end of the spout is maintained in proper operative relation to the cutter bar, by the clamping bolts 20 and 21 before alluded to, the hooked portions of which extend through lugs 32 projecting rearwardly from the spout.

By the provision of the coupling rod 6 flexibly connected with the operating shaft 4, the mechanism will accommodate itself to lawn mowers of different sizes where the axis of the knife reel when the lawn mower is clamped in position, does not align with the axis of shaft 4, the coupling rod in such cases assuming an angular relation to shaft 4 without interfering with the transmission of the rotary motion from the shaft of the knife reel.

My improved mechanism is simple in its construction and is effective in its operation and may be quickly coupled with a lawn mower and operated to effect the sharpening action in a speedy manner. It may be applied to the different varieties of lawn mowers now on the market and by a slight change in the form of the coupling head 9, it may be readily adapted for connection with knife reel shafts whose ends are otherwise formed than in the particular example shown.

In the foregoing description and accompanying drawings I have set forth my invention in the particular detailed form and construction which I prefer to adopt, but it will be manifest that these details may be variously changed and modified without departing from the limits of the invention; and further it will be understood that the invention is not limited to any particular form or construction of the parts except in so far as such limitations are specified in the claims.

Having thus described my invention, what I claim is:

1. In a lawn mower sharpening mechanism, the combination of a suitable support, means for fastening a lawn mower thereon, an operating shaft mounted for rotation on the support, a coupling rod flexibly connected with said shaft, a coupling member flexibly connected with the rod and adapted to be operatively connected detachably with the knife reel of the lawn mower for rotating the same, and means for rotating said shaft.

2. In a lawn mower sharpening mechanism, the combination of a suitable support, a rotary operating member mounted thereon, means for fastening a lawn mower to said support, means flexibly connected with the operating member and adapted to be operatively connected detachably with the knife reel of the lawn mower for rotating the reel, and means for rotating said operating member.

3. In a lawn mower sharpening mechanism, the combination of a suitable support, means for fastening a lawn mower thereon, a shaft mounted on said support for rotation, a coupling rod for transmitting the rotary motion of the shaft to the knife reel of the lawn mower, a universal joint between the rod and shaft, a coupling head connected with the rod by a universal joint and adapted to be detachably connected with the knife reel for rotating it, and means for rotating said shaft.

4. In a lawn mower sharpening mechanism, the combination of a support, means for fastening a lawn mower thereon, a shaft mounted for rotation on the support and provided with means for detachably coupling it to the knife reel of the lawn mower, a counter shaft mounted for rotation on the support and geared to the first mentioned shaft, and means for rotating the counter shaft.

5. In a lawn mower sharpening mechanism, the combination of a support, means for fastening a lawn mower thereon, a shaft mounted for rotation on the support and provided with means for detachably coupling it to the knife reel of the lawn mower, a pinion on the shaft, a second shaft rotatably mounted on the support, a pinion on the second shaft meshing with that on the other shaft, and a hand crank on the second shaft.

6. In a lawn mower sharpening mechanism, the combination of a support, means for fastening a lawn mower thereon, a shaft mounted for rotation on the support and provided with means for detachably coupling it to the knife reel of the lawn mower, a pulley on the shaft for rotating it, a second shaft mounted for rotation on the support, a gearing connecting the two shafts, and a hand crank on the second shaft for rotating it, said second shaft and connected parts being removable at will from the support.

7. In a lawn mower sharpening mechanism, the combination of a support, means for fastening thereon a lawn mower to be sharpened, an operating member mounted on the support and adapted to be coupled to the knife reel of the lawn mower to rotate said reel in a reverse direction to sharpen the knives, and a hopper for abrasive material provided with means cooperative with the handle braces of the lawn mower for supporting said hopper in operative position, said hopper being provided with a spout in position to discharge abrasive material directly onto the cutter bar.

8. In a lawn mower sharpening mechanism, the combination of a suitable support, an operating member mounted for rotation thereon, said support adapted to sustain a lawn mower with its knife reel in position to be coupled detachably to the operating member for rotation to cause the knives to impinge against the cutter bar, a hopper for abrasive material provided with means for sustaining it by the lawn mower in position to direct the abrasive material to the cutter bar, clamping devices adapted to engage the lawn mower and support to hold the lawn mower fixedly in position thereon and adapted also to engage the said hopper to maintain it in position, and means for rotating the operating member.

In testimony whereof, I have affixed my signature hereto.

JAMES P. MEAD.